(12) United States Patent
Kini

(10) Patent No.: US 8,559,432 B2
(45) Date of Patent: Oct. 15, 2013

(54) PSEUDO-WIRE PROVIDING AN IN-BAND CONTROL CHANNEL USING AN OFFSET

(75) Inventor: Sriganesh Kini, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 234 days.

(21) Appl. No.: 12/982,734

(22) Filed: Dec. 30, 2010

(65) Prior Publication Data

US 2012/0076145 A1    Mar. 29, 2012

Related U.S. Application Data

(60) Provisional application No. 61/385,630, filed on Sep. 23, 2010.

(51) Int. Cl.
*H04L 12/28*    (2006.01)

(52) U.S. Cl.
USPC .......................................... 370/392; 370/351

(58) Field of Classification Search
None
See application file for complete search history.

(56) References Cited

U.S. PATENT DOCUMENTS

| | | | |
|---|---|---|---|
| 7,417,950 B2 * | 8/2008 | Hofmeister et al. | 370/230 |
| 7,953,097 B2 * | 5/2011 | Hart et al. | 370/395.54 |
| 8,054,830 B2 * | 11/2011 | Jain et al. | 370/389 |
| 8,111,633 B1 * | 2/2012 | Aggarwal et al. | 370/256 |
| 8,208,469 B2 * | 6/2012 | Tochio | 370/392 |
| 2006/0285500 A1 * | 12/2006 | Booth et al. | 370/250 |
| 2008/0151905 A1 * | 6/2008 | Krzanowski | 370/395.5 |
| 2009/0168783 A1 | 7/2009 | Mohan et al. | |
| 2011/0090909 A1 * | 4/2011 | Krzanowski | 370/392 |
| 2011/0182189 A1 * | 7/2011 | Martini et al. | 370/248 |
| 2011/0261812 A1 * | 10/2011 | Kini et al. | 370/389 |
| 2012/0002539 A1 * | 1/2012 | Khan et al. | 370/227 |

OTHER PUBLICATIONS

Nadeau, T., "Pseudowire Virtual Circuit Connectivity Verification (VCCV): A Control Channel for Pseudowires," RFC 5085, Dec. 2007, 30 pages.
Del Regno, N., et al., "Mandatory Features of Virtual Circuit Connectivity Verification Implementation", draft-delregno-pwe3-vccv-mandatory-features-02, Apr. 2011, 8 pages.
Bryant, S., Flow Aware Transport of Pseudowires over an MPLS PSN draft-ietf-pwe3-fat-pw-03, Jul. 2010, 19 pages.
Kini, S., "Encapsulation Methods for Transport of packets over an MPLS PSN—efficient for IP/MPLS draft-kini-pwe3-pkt-encap-efficient-ip-mpls-02.txt", 26 pages.
Nicklass, O., "Definitions of Managed Objects for the DS1, E1, DS2, and E2 Interface Types", http://www.ietf.org/rfc/rfc3895.txt, Sep. 2004, 84 pages.

* cited by examiner

*Primary Examiner* — Phirin Sam
(74) *Attorney, Agent, or Firm* — Blakely, Sokoloff, Taylor & Zafman

(57) ABSTRACT

A method implemented by a first provider equipment (PE) device to enable operations, administration and management (OAM) functionality over a pseudo-wire (PW) between the first PE device and a second PE device, wherein the PW traverses a packet switched network and carries control channel messages and a flow of data packets, and where the packet switched network includes nodes that use information outside a pseudo-wire label stack of the data packets for determining multi-path routing, the method including receiving a control channel message at the first PE to be forwarded over the pseudo-wire to the second PE, and prefixing the control channel message with a pseudo-flow header to ensure that the control channel message is forwarded over a same route by the nodes of the packet switched network as the data packets of the flow, thereby enabling OAM functionality to be accurately performed for the pseudo-wire.

10 Claims, 3 Drawing Sheets

PSEUDO-WIRE PROVIDING AN IN-BAND CONTROL CHANNEL USING AN OFFSET

CROSS-REFERENCE TO RELATED APPLICATION

The present application claims priority from U.S. Provisional Patent Application No. 61/385,630, filed on Sep. 23, 2010.

FIELD OF THE INVENTION

The embodiments of the invention relate to a system for providing in-band control channels over a pseudo-wire. Specifically, the embodiments of the invention relate to a system where virtual circuit connectivity verification and similar operations, administration and management functions can be performed over an in-band control channel while intermediate nodes utilize non-pseudo-wire label stack information in multi-path decision making.

BACKGROUND

A pseudo-wire is a mechanism that emulates the essential attributes of a telecommunications service (such as a T1 leased line or Frame Relay) over a variety of Packet Switched Network (PSN) types. A pseudo-wire is intended to provide only the minimum necessary functionality to emulate the service with the required degree of faithfulness for the given service definition. The required functions of pseudo-wires include encapsulating service-specific bit streams, cells, or protocol data units (PDUs) arriving at an ingress port of a networking device and forwarding them across an Internet Protocol (IP) path or Multi Protocol Label Switching MPLS tunnel. In some cases, it is necessary to perform other operations within the pseudo-wire, such as managing the timing and order of data transmissions and to emulate the behavior and characteristics of the service to a required degree of faithfulness.

From the perspective of Customer Equipment (CE) devices, a pseudo-wire is characterized as an unshared link or circuit of the chosen service. In some cases, there are deficiencies in the pseudo-wire emulation that impact the traffic carried over a pseudo-wire. These deficiencies limit the applicability of this technology. These limitations must be fully described in the appropriate service-specific documentation and can make pseudo-wires unsuitable for some service or customers.

One service that can be impacted over a pseudo-wire is operations, administration and management (OAM) functionality. Some OAM functionality requires that OAM data be handled in the same manner as other data over the pseudo-wire. Virtual Circuit Connectivity Verification (VCCV) is an OAM function that is impacted by multi-path decision making in the PSN. Current pseudo-wires have limited or restricted support for VCCV, because the OAM messages such as OAM alert label VCCV (type 2) and time-to-live expiry VCCV (type 3) are not in-band, thus they are not ensured to be routed the same way as other traffic across the PSN in the pseudo-wire. VCCV using a control word (type 1) is in-band, but limits multi-path routing to the use of information of the pseudo-wire label stack.

SUMMARY

A method implemented by a first provider equipment (PE) device to enable operations, administration and management (OAM) functionality over a pseudo-wire (PW) between the first PE device and a second PE device, wherein the PW traverses a packet switched network and carries control channel messages and a flow of data packets, and where the packet switched network includes nodes traversed by the pseudo-wire that use information outside a pseudo-wire label stack of the data packets for determining multi-path routing, the method comprising the steps of receiving a control channel message at the first PE, the control channel message to be forwarded over the pseudo-wire to the second PE; determining that the pseudo-wire was negotiated to support an offset based control channel; prefixing the control channel message with a pseudo-flow header, the pseudo-flow header matching a header that is also part of the data packets of the flow, that is outside the pseudo-wire label stack of the data packets, and that is used by the nodes for determining multi-path routing of the data packets, the pseudo-flow header of the control channel message to ensure that the control channel message is forwarded over a same route by the nodes of the packet switched network as the data packets of the flow, thereby enabling OAM functionality specified by the control channel message to be accurately performed for the pseudo-wire; and forwarding the control channel message with the pseudo-flow header to the second PE over the pseudo-wire.

A method implemented by a first provider equipment (PE) device to enable operations, administration and management (OAM) functionality over a pseudo-wire (PW) between the first PE device and a second PE device, wherein the PW traverses a packet switched network and carries control channel messages and a flow of data packets, and where the packet switched network includes nodes traversed by the pseudo-wire that use information outside a pseudo-wire label stack of the data packets for determining multi-path routing, the method comprising the steps of receiving a control channel message over the pseudo-wire from the second PE; determining that the control channel message is an offset based control channel message; and processing the control channel message at a packet offset after pseudo-header, in response to determining that the control channel message is the offset based control channel message, wherein the offset based control channel message includes a pseudo-flow header, the pseudo-flow header matching a header that is also part of the data packets of the flow, that is outside the pseudo-wire label stack of the data packets, and that is used by the nodes for determining multi-path routing of the data packets, the pseudo-flow header of the control channel message to ensure that the control channel message is forwarded over a same route by the nodes of the packet switched network as the data packets of the flow, thereby enabling OAM functionality specified by the control channel message to be accurately performed for the pseudo-wire.

A network element configured to function as a first provider equipment (PE) device to enable operations, administration and management (OAM) functionality over a pseudo-wire (PW) between the first PE device and a second PE device, wherein the PW traverses a packet switched network and carries control channel messages and a flow of data packets, and where the packet switched network includes nodes traversed by the pseudo-wire that use information outside a pseudo-wire label stack of the data packets for determining multi-path routing, the method comprising the steps of, the network element comprising an ingress module configured to receive data packets over a network connection between the first PE and the packet switched network; an egress module configured to transmit data packets over the network connection; a network processor communicatively coupled to the ingress module and egress module, the network processor configured to execute a pseudo-wire management module, a control channel management module and an OAM module, the pseudo-wire management module configured to establish and maintain a pseudo-wire between the first PE device and the second PE device over the packet switched network, the control channel management module communicatively coupled to the pseudo-wire management module, the control channel management module configured to add a prefix to an offset based control channel message to be sent over the pseudo-wire, wherein the offset based control channel message includes a pseudo-flow header, the pseudo-flow header matching a header that is also part of the data packets of the flow, that is outside the pseudo-wire label stack of the data packets, and that is used by the nodes for determining multi-path routing of the data packets, the pseudo-flow header of the control channel message to ensure that the control channel message is forwarded over a same route by the nodes of the packet switched network as the data packets of the flow, thereby enabling OAM functionality specified by the control channel message to be accurately performed for the pseudo-wire, the control channel management module configured to identify the offset based control channel message and initiate processing of the offset based control channel message on the contents of the message following the pseudo-flow header, and the OAM module configured to process OAM functionality defined in the offset based control channel message.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
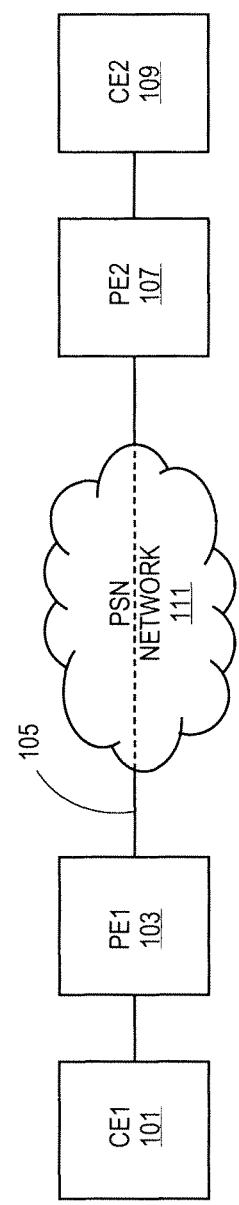
FIG. 1 is a diagram of one embodiment of a network utilizing a pseudo-wire.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operation of the flow diagrams will be described with reference to the exemplary embodiments of FIGS. 1 and 2. However, it should be understood that the operations of the flow diagrams can be performed by embodiments of the invention other than those discussed with reference to FIGS. 1 and 2, and the embodiments discussed with reference to FIGS. 1 and 2 can perform operations different than those discussed with reference to the flow diagrams of FIGS. 3 and 4.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The embodiments of the present invention provide a system, network and method for avoiding the disadvantages of the prior art including existing control channels for pseudo-wires such as time-to-live (TTL) expiry control channels (Type 3 control channel) that are either not in-band control channels, meaning they do not travel the same path over network as data traffic or they do not permit intermediate nodes to look beyond the pseudo-wire label stack of a data packet when making multi-path decisions thereby limiting multi-path decisions making options for the pseudo-wire. Specifically, in-band control channels defined for VCCV require a control word to be enabled for the pseudo-wire. However, when a control word is enabled for a pseudo-wire, the intermediate nodes, e.g., label switch routers (LSRs) cannot look beyond a label stack in an IP reader for multi-path decisions, which is commonly used for multi-path load sharing based on end to end flow, without the use of separate mechanisms such as FAT-pseudo-wires (FAT-PW).

The embodiments of the invention overcome the disadvantages of the prior art by providing an in-band control channel, which uses a fixed offset after a pseudo-wire label stack, this can be used as a part of a VCCV control channel and can be an extension of the TTL expiry VCCV control channel. A fixed number of bytes between the pseudo-wire label stack and the start of an associated channel are used to mimic flow header information and function as pseudo-flow header that ensures that the OAM data takes the same route as other data through the packet switched network using multi-path load sharing.

FIG. 1 is a diagram of one embodiment of a network implementing the in-band control channel for pseudo-wires using an offset. In one embodiment, the network includes a set of customer equipment devices 101, 109 and a set of provider equipment devices 103, 107 communicating with one another over a pseudo-wire 105. A 'set,' as used herein, is any positive whole number of items including one item. The pseudo-wire 105 traverses a packet switched network 111. The customer equipment devices 103, 107 are coupled to the provider equipment device 103, 107 through an attachment circuit.

As used herein an 'attachment circuit' is a physical or virtual circuit attaching a customer equipment device to a provider equipment device. An attachment circuit may be, for example, a Frame Relay DLCI, an ATM VPI/VCI, an Ethernet port, a VLAN, a PPP connection on a physical interface, a PPP session from an L2TP tunnel, or an MPLS LSP. If both physical and virtual attachment circuits are of the same technology (e.g., both ATM, both Ethernet, both Frame Relay), the pseudo-wire is said to provide "homogeneous transport," otherwise, it is said to provide "heterogeneous transport."

Customer equipment 101, 109 can be any type of networking element. The customer equipment devices 101, 109 can in turn be connected to customer networks and user devices to provide connectivity to any user devices in any customer networks in which the customer equipment devices 101, 109 operate, respectively. Similarly, provider equipment devices 103, 107 can be any type of networking elements that provide access to the wide area network such as the Internet or similar packet switch networks 111. A packet switch network 111 can be any type of wide area network including the Internet that uses a packet based transmission protocol such as the Internet Protocol. The customer equipment devices 101, 109, provider equipment devices 103, 107 and the intermediate devices in the packets switch network 111 can be connected using any type of wired or wireless communication mediums.

A pseudo-wire 105 can connect two customer networks to one another supporting services between the two networks as though directly connected rather than separated by a packet switched network 111 and provider equipment 103, 107. The pseudo-wire 105 can traverse any number of intermediate nodes in the packet switched network 111 and be implemented using multiprotocol label switching (MPLS) or similar technologies. The pseudo-wire traffic can traverse multiple paths through the packet switched network when multi-path (MPLS) and similar technologies are used. To determine a path for a particular data packet across a multi-path topology, intermediate nodes can examine any parts of the packet to perform load sharing and multi-path decision making.

Figure 2:
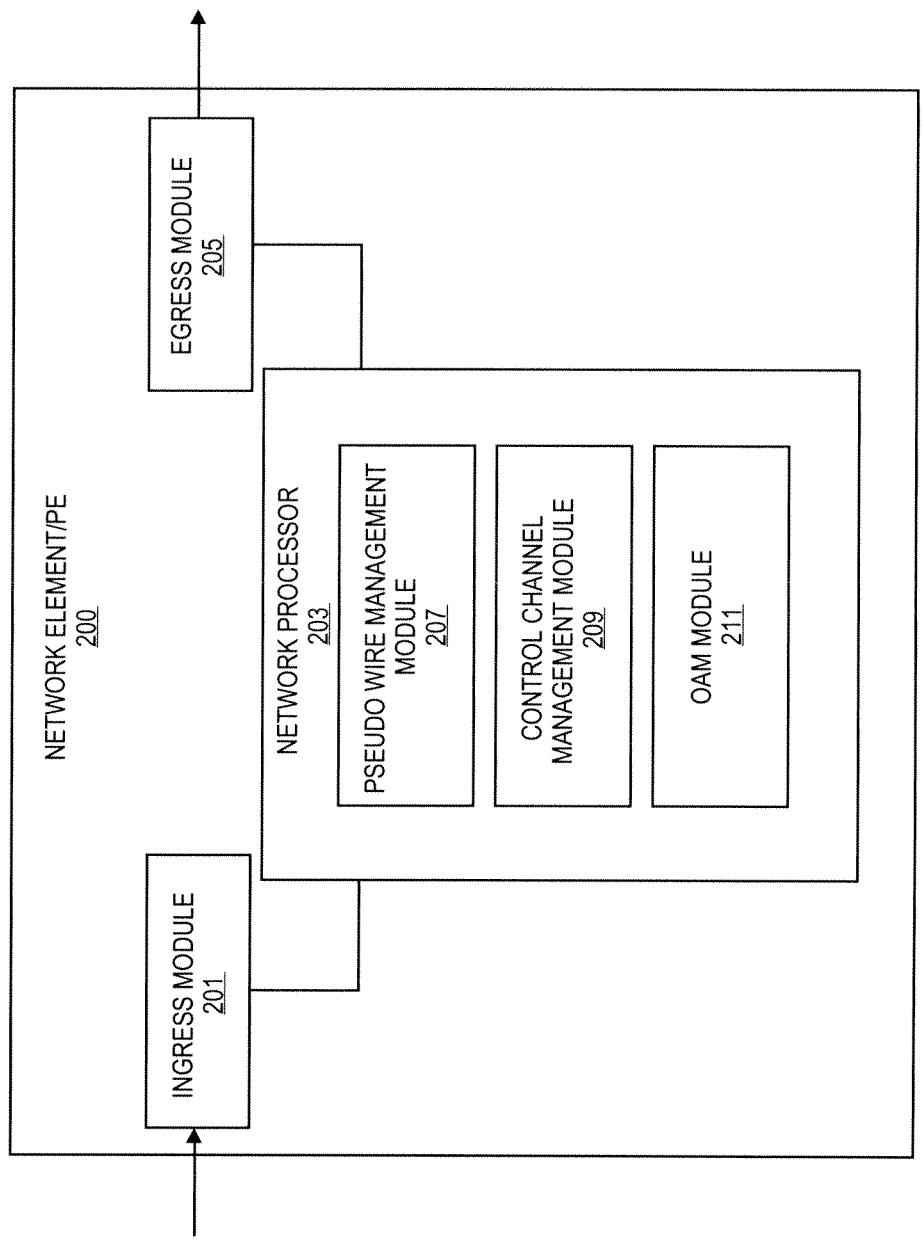
FIG. 2 is a diagram of one embodiment of a network element implementing the pseudo-wire supporting an in-band control channel using an offset.

FIG. 2 is a diagram of one embodiment of a network element functioning as a provider equipment device. Network element 200 includes an ingress module 201, an egress module 205 and a network processor 203. The ingress module 201 can handle the processing of data packets being received by network element 200 at the physical link and data link level. The egress module 205 handles the processing of data packets being transmitted by the network element 200 at the physical link and data link level. The network processor 203 handles the routing, forwarding and higher level processing of the data traffic. The processor 203 can execute or include a pseudo-wire management module 207, a control channel management module 209 and operations, administration and management (OAM) module 211. The network processor 203 can be a general purpose processor such as a central processing unit or a specialized network processor. One of ordinary skill in the art would understand that the network element 200 can be any type of computing device and would include memory devices, persistent storage, buses and similar standard computing architecture. These elements have been omitted for sake of clarity.

The pseudo-wire management module 207 handles the establishment and operation of pseudo-wires between the network element 200 and other network elements or other computing devices. The pseudo-wire management module 207 negotiates the types of supported control channels with the other network elements including the use of an in-band control channel using an offset.

A control channel management module 209 manages the control channels of pseudo-wires established by the pseudo-wire management module 207. The control channel management module 209 can execute the processes described below in regard to FIGS. 2 and 3 including sending and receiving messages over the control channel of the pseudo-wires.

The OAM module 211 handles OAM messages and functions such as VCCV. OAM messages can be received from or sent to other network elements through the control channel of the respective pseudo-wire. Some OAM functions such as VCCV are affected by the routing of data packets through the underlying packet switched network, however the in-band control channel ensures that these OAM messages will traverse the same path as other data traffic in the pseudo-wire.

Figure 3:
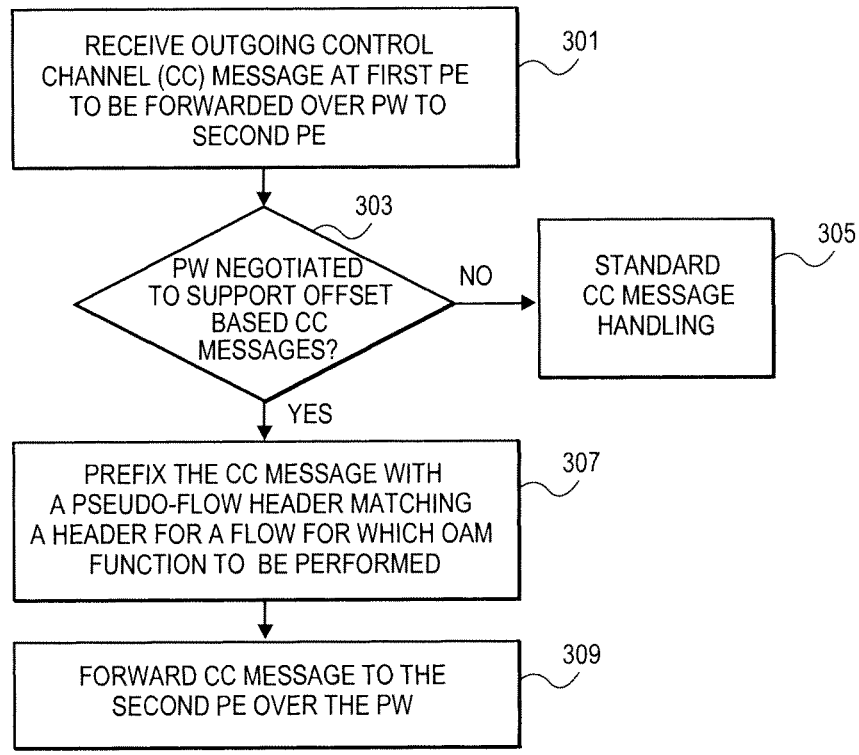
FIG. 3 is a flowchart of one embodiment of the process for handling outgoing control channel messages.

FIG. 3 is flowchart of one embodiment of a process for handling outgoing control channel messages at the first provider equipment device which are forwarded over a pseudo-wire to a second provider equipment device. The pseudo-wire is negotiated and established between the provider equipment devices. The negotiation defines which types of control channels are supported between the devices. In one embodiment, the pseudo-wire supports an offset based control channel that is in-band control channel that uses a pseudo-header that requires an offset to be applied prior to further processing at the destination provider equipment device. This offset type control channel is implemented at each end of the pseudo-wire by the provider equipment devices. The provider equipment device in sending or initiating a control channel message executes the illustrated process. The provider equipment device may internally generate a control channel message or receive a command to initiate a control channel message from external devices.

The control channel messages and control channel generally can be utilized for setting up and tearing down functions as well as, operation, administration and management (OAM) functions. The control channel messages encapsulate the functions to be performed at the other end of the pseudo-wire. These control channels can be processed by the pseudo-wire management module in combination with the control management module and may work in combination with the OAM module 211 to implement the OAM functionality.

In one embodiment, the process is initiated when a control channel message is received by the control channel management module of the network element operating as the first provider equipment device, where the control channel message is to be forwarded over the pseudo-wire to the second provider equipment device (Block 301). The control channel management module determines which types of control channels are supported based on configuration information for the pseudo-wire over which the control channel message is to be forwarded (Block 303). In other words, the control channel management module checks to determine whether the pseudo-wire was negotiated to support the offset based control channel type. If the associated pseudo-wire does not support the offset based control channel, then the standard control channel message handling is applied (Block 305). See for reference RFC 3895 and RFC 5085, which describe standard pseudo-wire and control channel handling.

If the pseudo-wire does support the offset based control channel, then the control channel message is prefixed with a pseudo-flow header that matches a header of the flow for which the OAM functionality is to be performed (Block 307). The pseudo-flow header content can be determined by copying it from the header information of packets in the flow that the control channel message is associated with. The pseudo-flow header can have any size to match any portion of the corresponding data flow header. The size of the pseudo-flow header can be negotiated when the pseudo-wire is set up. In one example embodiment, a 64 byte pseudo-flow header is utilized to match a typical 64 byte flow header for standard pseudo-wire flows. In addition, the control channel message is given a pseudo-wire header expiry time-to-live value of one. This value helps the second pseudo-wire provider equipment device to determine that the prefixed pseudo-flow header data is not a legitimate header, by indicating that the incoming control channel message should be handled as an offset based control channel type message.

After the pseudo-flow header has been attached to the control channel message, the control channel message is then forwarded to the second provider equipment device over the pseudo-wire associated with the control channel message (Block 309). Each pseudo-wire has an egress port either physical or virtual that is associated with the pseudo-wire. The control channel message traverses the underlying packet switched network along the same route as other data because the same multi-path routing decisions are made for the control channel message due to the similarity in the header information, which can play a role in the routing algorithms.

Figure 4:
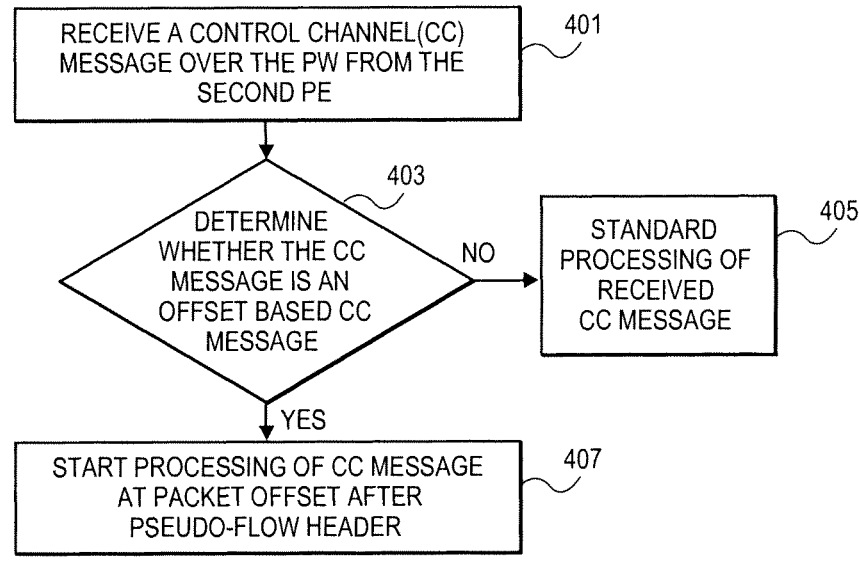
FIG. 4 is a flowchart of one embodiment of a process for handling in-bound control channel messages.

FIG. 4 is a flowchart of one embodiment of a process of handling a control channel message being received over a pseudo-wire. In one embodiment, the process is initiated in response to receiving a control channel message over a pseudo-wire from a second provider equipment device (Block 401). The control channel messages can be identified by explicit header information or by identifying that the pseudo-wire expiry time-to-live value in the pseudo-wire label stack is one or by any combination thereof.

Upon determining that the received data packet is a control channel message, the message is analyzed to determine whether it is an offset based control channel type message (Block 403). The particular type of the control channel message can be identified through examining the pseudo-flow header information or by examining header information after the offset. Identifying that the pseudo-flow label header has an expiry time-to-live value of one can also play a role in identifying the control channel message type. If the control channel message is not an offset based control channel message then the standard control channel message processing is applied (Block 405). See for example, RFC 3895 and 5085, which describe standard pseudo-wire and control channel message processing.

However, if the inbound control channel message is an offset based control channel message, then the incoming control channel message can be processed by either offsetting the point of processing the received control channel message to ignore the pseudo-flow header or by removing the pseudo-flow header. The processing of the control channel message including the offset identification can be performed by the control channel management module. The encapsulated OAM message can also be retrieved by the control channel management module and may be passed on to the OAM module for processing. In one embodiment, the OAM functionality defined in the control channel message is a virtual circuit connectivity verification (VCCV) function. The accuracy of this OAM function is enabled by using the pseudo-flow header to match the characteristics of the headers of the flow in which the control channel message is associated, which ensures that the multi-path decision making of the intermediate nodes in the underlying packet switched network is the same for the control channel message as it is for the other messages in the other data flows, specifically the data flow having header information matching the pseudo-flow header.

Thus, a method, system and apparatus for enabling offset based control channels and OAM functionality such as VCCV for a pseudo-wire over a packet switched network using multi-path decision making algorithms that look beyond the pseudo-wire label stack has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a first provider equipment (PE) device to enable operations, administration and management (OAM) functionality over a pseudo-wire (PW) between the first PE device and a second PE device, wherein the PW traverses a packet switched network and carries control channel messages and a flow of data packets, and where the packet switched network includes nodes traversed by the pseudo-wire that use information outside a pseudo-wire label stack of the data packets for determining multi-path routing, the method comprising the steps of:

receiving a control channel message at the first PE, the control channel message to be forwarded over the pseudo-wire to the second PE;

determining that the pseudo-wire was negotiated to support an offset based control channel;

prefixing the control channel message with a pseudo-flow header, the pseudo-flow header matching a header that is also part of the data packets of the flow, that is outside the pseudo-wire label stack of the data packets, and that is used by the nodes for determining multi-path routing of the data packets, the pseudo-flow header of the control channel message to ensure that the control channel message is forwarded over a same route by the nodes of the packet switched network as the data packets of the flow, thereby enabling OAM functionality specified by the control channel message to be accurately performed for the pseudo-wire; and forwarding the control channel message with the pseudo-flow header to the second PE over the pseudo-wire.

2. The method of claim 1, wherein the OAM functionality includes virtual circuit connectivity verification.

3. The method of claim 1, wherein the prefix is a 64 byte flow header.

4. The method of claim 1, wherein the control channel message includes a pseudo-wire label time-to-live value of one.

5. A method implemented by a first provider equipment (PE) device to enable operations, administration and management (OAM) functionality over a pseudo-wire (PW) between the first PE device and a second PE device, wherein the PW traverses a packet switched network and carries control channel messages and a flow of data packets, and where the packet switched network includes nodes traversed by the pseudo-wire that use information outside a pseudo-wire label stack of the data packets for determining multi-path routing, the method comprising the steps of:

receiving a control channel message over the pseudo-wire from the second PE;

determining that the control channel message is an offset based control channel message; and processing the control channel message at a packet offset after pseudo-header, in response to determining that the control channel message is the offset based control channel message, wherein the offset based control channel message includes a pseudo-flow header, the pseudo-flow header matching a header that is also part of the data packets of the flow, that is outside the pseudo-wire label stack of the data packets, and that is used by the nodes for determining multi-path routing of the data packets, the pseudo-flow header of the control channel message to ensure that the control channel message is forwarded over a same route by the nodes of the packet switched network as the data packets of the flow, thereby enabling OAM functionality specified by the control channel message to be accurately performed for the pseudo-wire.

6. The method of claim 5, wherein determining whether the control channel message is an offset based control message further comprises the steps of:

determining whether the pseudo-wire label time-to-live value is one.

7. The method of claim 5, wherein the packet offset and pseudo-flow header size is 64 bytes.

8. A network element configured to function as a first provider equipment (PE) device to enable operations, administration and management (OAM) functionality over a pseudo-wire (PW) between the first PE device and a second PE device, wherein the PW traverses a packet switched network and carries control channel messages and a flow of data packets, and where the packet switched network includes nodes traversed by the pseudo-wire that use information outside a pseudo-wire label stack of the data packets for determining multi-path routing, the method comprising the steps of, the network element comprising:

an ingress module configured to receive data packets over a network connection between the first PE and the packet switched network;

an egress module configured to transmit data packets over the network connection;

a network processor communicatively coupled to the ingress module and egress module, the network processor configured to execute a pseudo-wire management module, a control channel management module and an OAM module, the pseudo-wire management module configured to establish and maintain a pseudo-wire between the first PE device and the second PE device over the packet switched network, the control channel management module communicatively coupled to the pseudo-wire management module, the control channel management module configured to add a prefix to an offset based control channel message to be sent over the pseudo-wire, wherein the offset based control channel message includes a pseudo-flow header, the pseudo-flow header matching a header that is also part of the data packets of the flow, that is outside the pseudo-wire label stack of the data packets, and that is used by the nodes for determining multi-path routing of the data packets, the pseudo-flow header of the control channel message to ensure that the control channel message is forwarded over a same route by the nodes of the packet switched network as the data packets of the flow, thereby enabling OAM functionality specified by the control channel message to be accurately performed for the pseudo-wire, the control channel management module configured to identify the offset based control channel message and initiate processing of the offset based control channel message on the contents of the message following the pseudo-flow header, and the OAM module configured to process OAM functionality defined in the offset based control channel message.

9. The network element of claim 8, wherein the control channel management module is configured to offset processing 64 bytes into the offset based control channel message.

10. The network element of claim 8, wherein the control channel management module is configured to identify the offset based control channel message by identifying a pseudo-wire label having a time-to-live value of one.

* * * * *